United States Patent
Miyakawa et al.

[11] Patent Number: 5,920,413
[45] Date of Patent: Jul. 6, 1999

[54] METHOD AND DEVICE FOR OPTICAL ADD/DROP MULTIPLEXING USING HIGH SPEED POLARIZATION SCRAMBLER

[75] Inventors: Takayuki Miyakawa, Kawaguchishi; Hidenori Taga, Sakadoshi; Shu Yamamoto, Shikishi; Shigeyuki Akiba, Tokyo, all of Japan

[73] Assignees: Kokusai Denshin Denwa Kabushiki-Kaisha; KDD Submarine Cable Systems Inc., both of Japan

[21] Appl. No.: 08/833,097

[22] Filed: Apr. 4, 1997

[30] Foreign Application Priority Data

Apr. 5, 1996 [JP] Japan ............................ 8-084005

[51] Int. Cl.$^6$ .................................................. H04J 14/02
[52] U.S. Cl. ...................... 359/130; 359/122; 359/156; 359/161; 385/24
[58] Field of Search ........................ 359/122, 124, 359/127, 130, 156, 161; 385/24, 11

[56] References Cited

U.S. PATENT DOCUMENTS 5,611,005  3/1997  Heismann et al. ................. 385/11
5,717,795  2/1998  Sharma et al. .................... 385/24
5,754,321  5/1998  Giles et al. ....................... 359/124

OTHER PUBLICATIONS

LOOC '95 Hong Kong FD1–2 (Integrated Optics and Optical Fiber Communication) abstract of Polarization Scrambling and Multiplexing in Optically–Amplified Transoceanic Communication Systems, by Fred Heismann pp. 92 to 93.

Primary Examiner—Kinfe-Michael Negash
Attorney, Agent, or Firm—Banner & Witcoff, Ltd.

[57] ABSTRACT

An optical add/drop multiplexing scheme capable of reducing the degradation of the transmission characteristic due to the beat noises caused by the interference of the fiber grating leakage components. An optical add/drop multiplexing device is formed by a high speed polarization scrambler for entering signal lights with a data modulation at a high speed bit rate applied thereto, and scrambling polarization states of entered signal lights at high speed, and an optical add/drop element for receiving the signal lights with the polarization states scrambled by the high speed polarization scrambler, and carrying out an add/drop multiplexing operation for signal lights in a specific wavelength among received signal lights. The high speed polarization scrambler scrambles the polarization states of the entered signal lights so as to lower a probability for having worst polarization states of signal lights and interference lights, by scrambling the polarization states of the entered signal lights into every possible polarization states at nearly equal probabilities.

18 Claims, 7 Drawing Sheets

(SIGNAL POWER (S) TO INTERFERENCE POWER (X) RATIO)

METHOD AND DEVICE FOR OPTICAL ADD/DROP MULTIPLEXING USING HIGH SPEED POLARIZATION SCRAMBLER

BACKGROUND OF THE INVENTION

1. Field of the Invention

The present invention relates to a method and a device for optical add/drop multiplexing to be used in extracting or inserting optical signals of a specific wavelength alone to/from optical wavelength division multiplexed signal lights in a plurality of wavelengths.

2. Description of the Background Art

A conventionally known example of an optical add/drop multiplexer (ADM) device has a configuration as shown in FIG. 1, where a fiber grating is used as a wavelength selection filter.

This optical ADM device of FIG. 1 comprises two optical circulators 71 and 75, and a fiber grating 73 provided therebetween, where the optical wavelength division multiplexed signal lights are entered into the first optical circulator 71 at an input port 71a. These signal lights are then circulated by the first optical circulator 71 from the input port 71a to an output port 71b, and entered into the fiber grating 73. The fiber grating 73 reflects only those signal lights in a specific wavelength alone among the entered optical wavelength division multiplexed signal lights, toward the first optical circulator 71. The reflected signal lights are then dropped as DROP signal lights (abbreviated hereafter as DROP lights) from a drop port 71a of the first optical circulator 71.

The signal lights in the other wavelengths which are not reflected by the fiber grating 73 will be transmitted through the fiber grating 73, and entered into the second optical circulator 75 at an input port 75a. These signal lights are then circulated by the second optical circulator 75 from the input port 75a to an output port 75b, and outputted from the output port 75b.

In addition, the second optical circulator 75 has an add port 75c from which ADD signal lights (abbreviated hereafter as ADD lights) in a specific wavelength are to be entered. The ADD lights are then circulated by the second optical circulator 75 from the add port 75c to the input port 75a, and entered into the fiber grating 73. The ADD lights entered into the fiber grating 73 are reflected by the fiber grating 73 and outputted from the output port 75b of the second optical circulator 75 along with the other signal lights which transmitted through the fiber grating 73 as described above.

In this conventional ADM device using the fiber grating, there has been a problem that the DROP lights and the ADD lights to be reflected by the fiber grating are actually not reflected completely, and some DROP lights and ADD lights will be transmitted through the fiber grating to directions opposite to their intended directions.

These transmission components depend on the rejection of the fiber grating. The DROP lights and the ADD lights have the same wavelength so that the leaked DROP light components, that is the leakage of the DROP lights into the ADD lights, interfere with the ADD lights, while the leaked ADD light components, that is the leakage of the ADD lights into the DROP lights, interfere with the DROP lights, and there has been a problem that the beat noises due to these interferences cause the degradation of the transmission characteristic.

In constructing an optical submarine cable system to be used for an optical wavelength division multiplexing communication, for example, it is necessary to account for a case of the worst penalty, and in order to realize a satisfactory level with no significant degradation of the transmission characteristic due to the beat noise between the ADD lights and the leaked DROP light components and the beat noise between the DROP lights and the leaked ADD light components, it is necessary to have about 50 dB of a difference between the signal light and the leaked light as indicated in FIG. 2.

However, currently, no fiber grating that can satisfy 50 dB of the rejection has been manufactured. Even if it is possible to manufacture such a fiber grating in future, it is expected to be quite expensive. According to the current fiber grating manufacturing technology, the rejection is about 35 dB at most, as can be seen from the transmittivity indicated in FIG. 3.

Consequently, the degradation of the transmission characteristic due to the beat noises has been the major problem in the system construction using the optical ADM device.

SUMMARY OF THE INVENTION

It is therefore an object of the present invention to provide a method and a device for optical add/drop multiplexing capable of reducing the degradation of the transmission characteristic due to the beat noises caused by the interference of the fiber grating leakage components, by using a high speed polarization scrambler that can be manufactured by the currently available manufacturing technology at a practically reasonable cheap manufacturing cost.

According to one aspect of the present invention there is provided an optical add/drop multiplexing device, comprising: a high speed polarization scrambler for entering signal lights with a data modulation at a high speed bit rate applied thereto, and scrambling polarization states of entered signal lights at high speed; and an optical add/drop element for receiving the signal lights with the polarization states scrambled by the high speed polarization scrambler, and carrying out an add/drop multiplexing operation for signal lights in a specific wavelength among received signal lights.

According to another aspect of the present invention there is provided a method of optical add/drop multiplexing, comprising the steps of: scrambling polarization states of input signal lights at high speed, the input signal lights being applied with a data modulation at a high speed bit rate; and carrying out an add/drop multiplexing operation for the signal lights in a specific wavelength among the signal lights with the polarization states scrambled by the scrambling step.

Other features and advantages of the present invention will become apparent from the following description taken in conjunction with the accompanying drawings.

DETAILED DESCRIPTION OF THE PREFERRED EMBODIMENTS

Referring now to FIG. 4 to FIG. 7, one embodiment of a method and a device for optical add/drop multiplexing according to the present invention will be described in detail.

Figure 4:
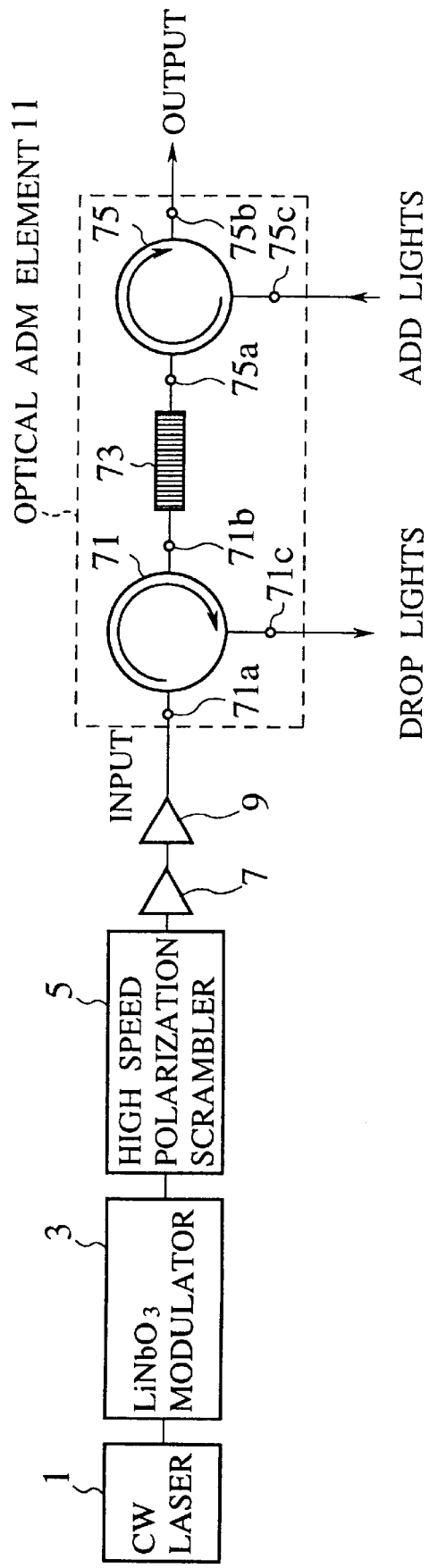
FIG. 4 is a block diagram of an optical add/drop multiplexing device according to one embodiment of the present invention.

FIG. 4 shows a configuration of an optical add/drop multiplexing device (abbreviated hereafter as optical ADM device) using a high speed polarization scrambler according to this embodiment, in which laser light signals of a uniform polarization generated by a CW (Continuous Wave) laser 1 are data modulated at a high speed bit rate of 5 GHz for example by an LiNbO$_3$ modulator 3, and entered into a high speed polarization scrambler (SCR) 5.

The high speed polarization scrambler 5 scrambles a polarization state of the entered light signals, which are data modulated by the LiNbO$_3$ modulator 3, at a high speed of 5 GHz for example, so as to lower a probability for having worst polarization states of the signal lights and the interference lights.

Here, it is preferable to use a frequency in an order of GHz as the high speed bit rate by which the data modulation is applied at the LiNbO$_3$ modulator 3, and a frequency of over one tenth of that high speed bit rate as a frequency for high speed scrambling at the high speed polarization scrambler 5, in order to realize an accurate high speed polarization scrambling.

Figure 1:
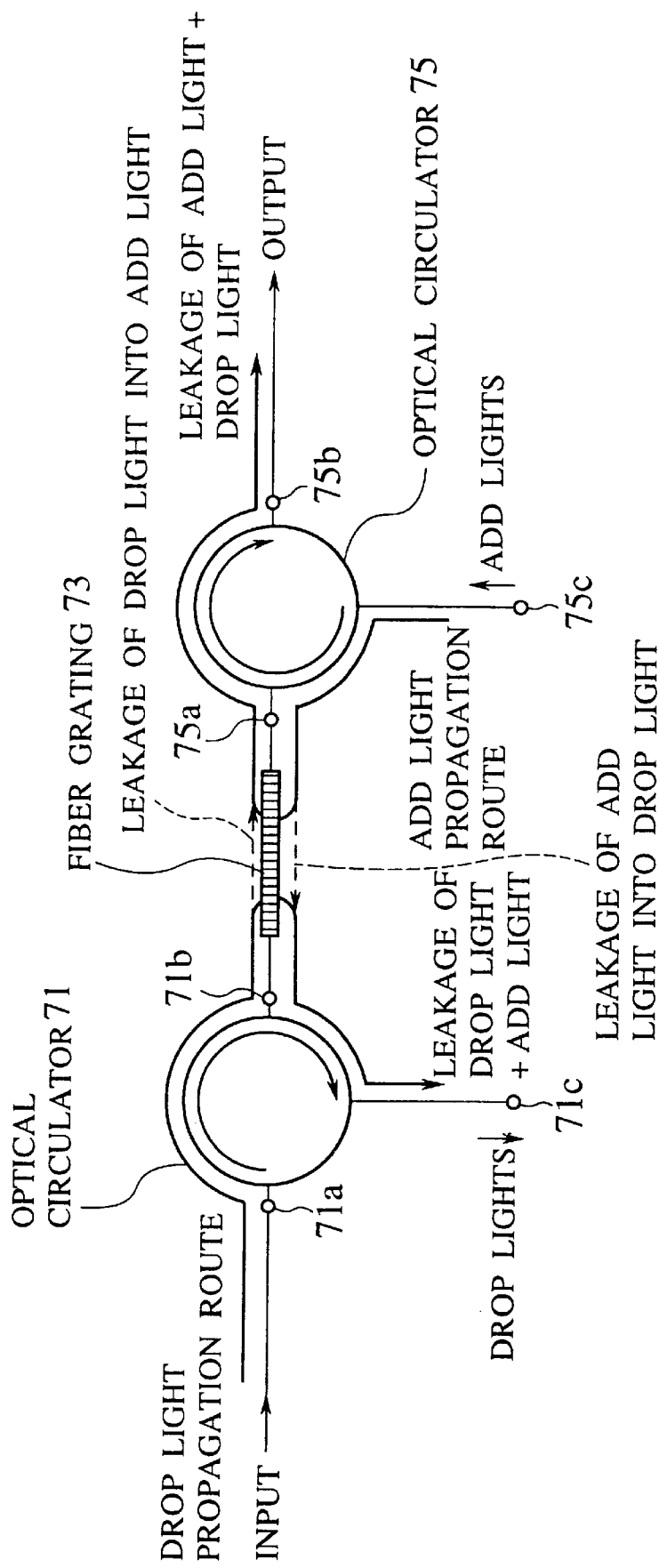
FIG. 1 is a schematic block diagram of a conventional optical add/drop multiplexing device.
Figure 2:
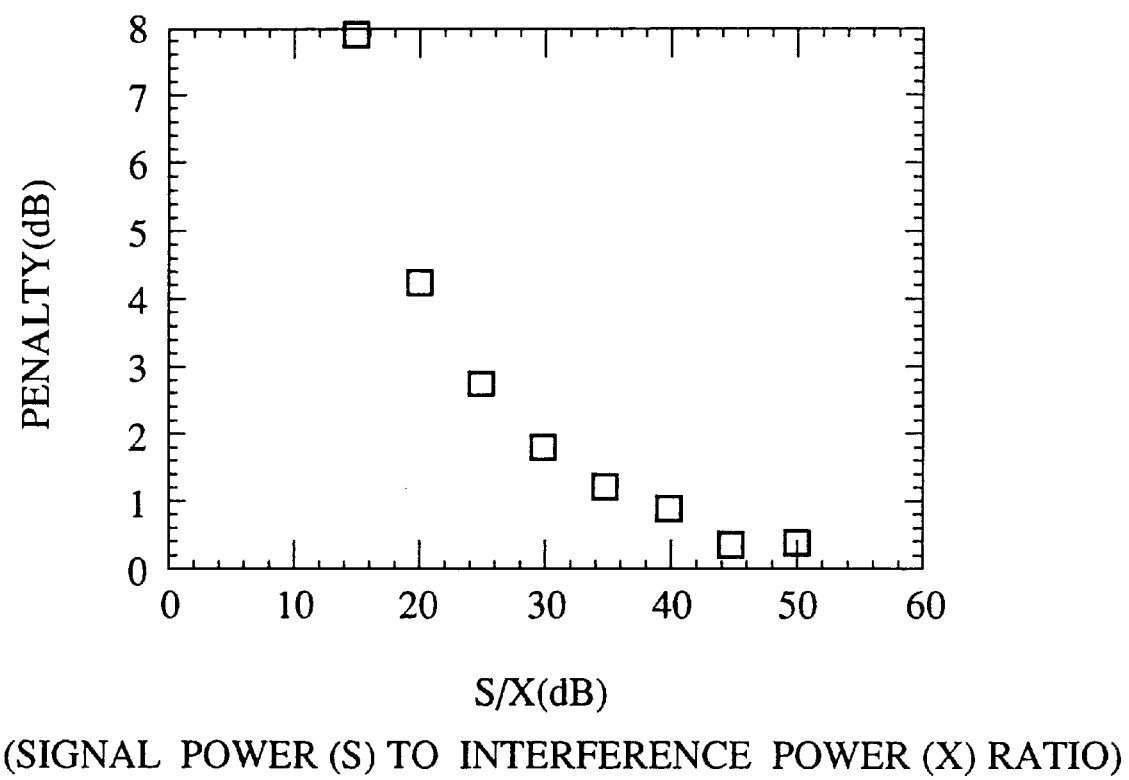
FIG. 2 is a graph of penalty versus signal power to interference power ratio for the conventional optical add/drop multiplexing device of FIG. 1.
Figure 3:
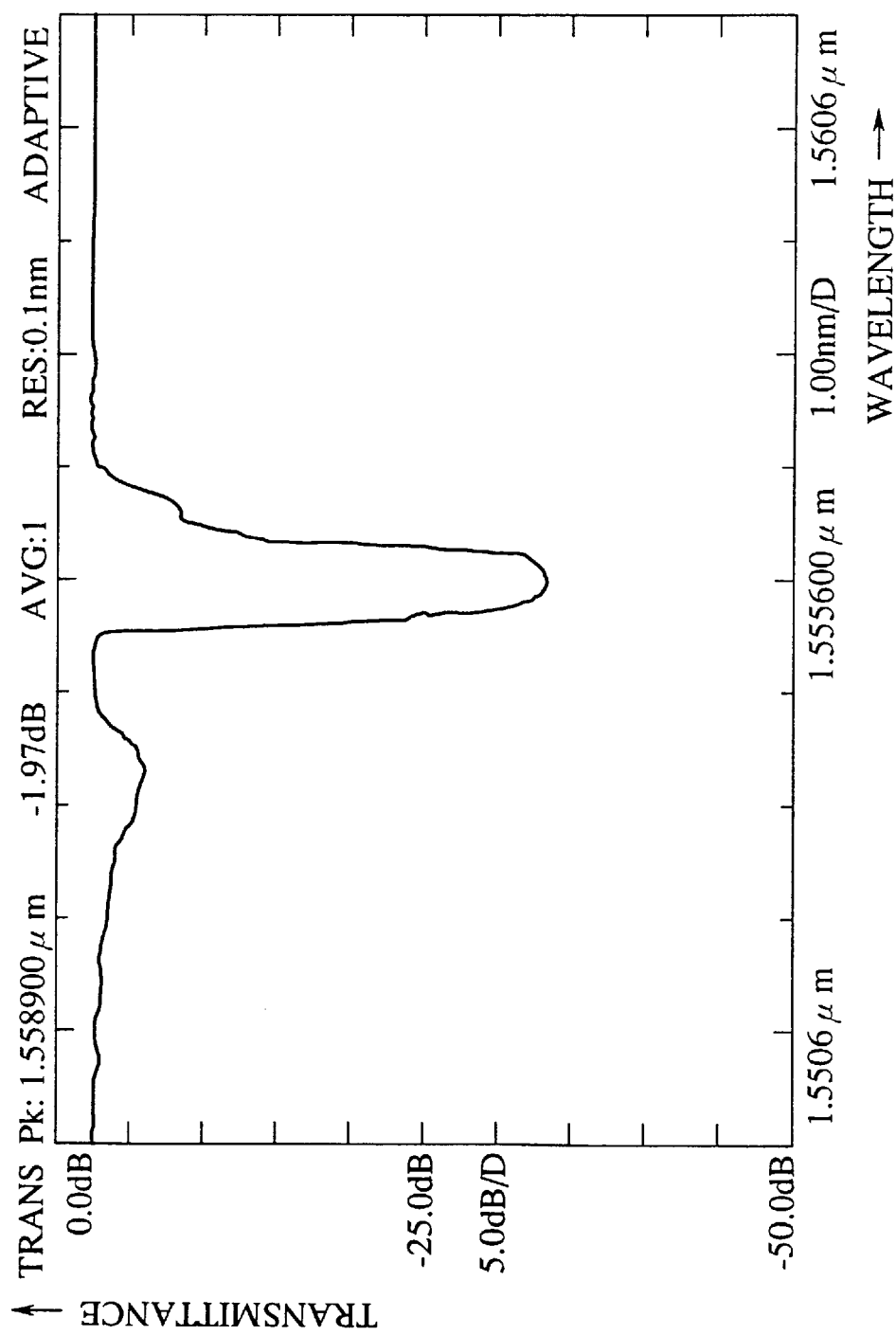
FIG. 3 is a graph of transmittivity versus wavelength for a currently available fiber grating.

The signal lights whose polarization states are high speed scrambled by the high speed polarization scrambler 5 are then entered into an optical ADM element 11, optionally through optical amplifiers 7 and 9. This optical ADM element 11 has substantially the same configuration as the optical ADM device of FIG. 1 described above which is formed by the first optical circulator 71, the fiber grating 73, and the second optical circulator 75, in which the signal lights of a specific wavelength alone among the entered signal lights are dropped from the drop port 71c as the DROP lights (DROP signal lights) while the signal lights in the other wavelengths and the ADD lights (ADD signal lights) added from the add port 75c are outputted from the output port 75b.

Figure 5:
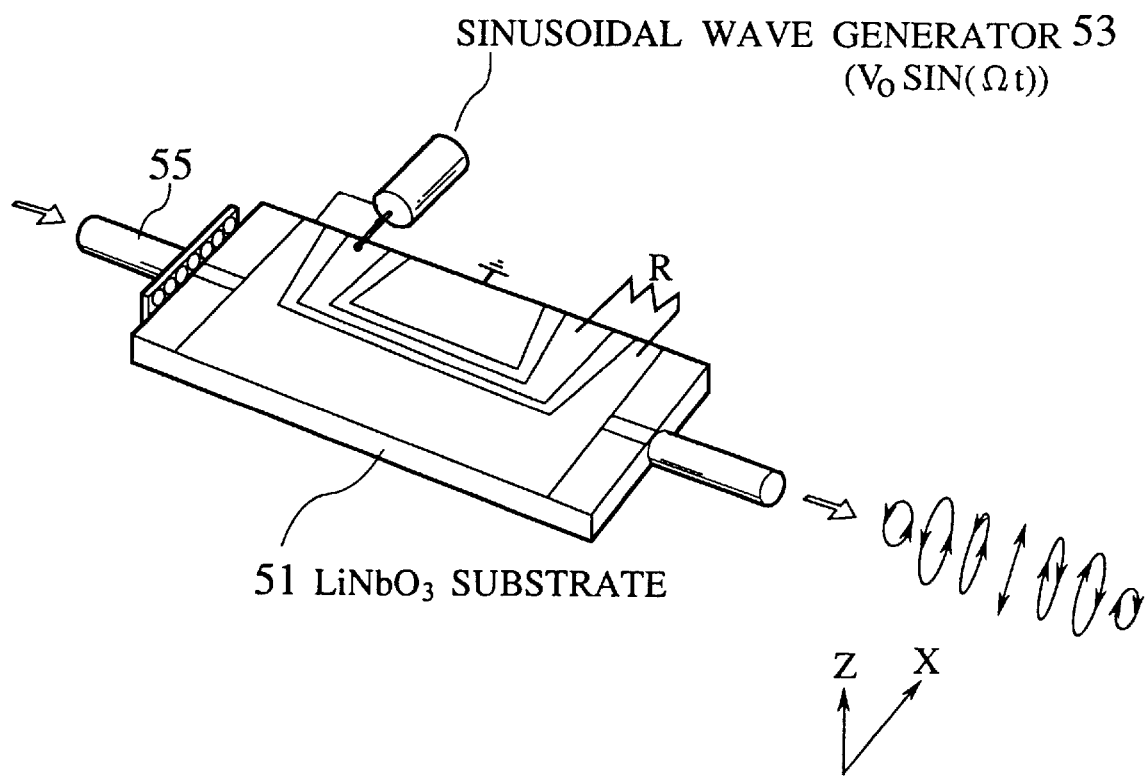
FIG. 5 is a schematic perspective view of a high speed polarization scrambler in the optical add/drop multiplexing device of FIG. 4.

The high speed polarization scrambler 5 has a detailed configuration as shown in FIG. 5, where a sinusoidal wave voltage (V$_0$ sin (Ωt)) of a constant amplitude generated by a sinusoidal wave generator 53 is applied to an electrode formed over an LiNbO$_3$ substrate 51, so as to vary the refractive index of the LiNbO$_3$ substrate 51 with respect to the signal lights in a 45° polarization state entered from an input fiber 55, so that the polarization states of the entered signal lights are scrambled at high speed into every possible polarization states at nearly equal probabilities. By scrambling the polarization states of the signal lights at high speed in this manner, it is possible to reduce a probability for having the worst polarization states of the signal lights and the interference lights, so that the penalty in a case of having the worst value for the transmission characteristic can be lowered.

More specifically, the penalty due to the beat noises in the optical ADM element 11 (the optical ADM device of FIG. 1) as noted above largely differs depending on the polarization states of the signal lights and the interference lights. Namely, a case of the worst polarization occurs when the entered signal lights and interference lights have the same polarization state, and a case of the best polarization occurs when the entered signal lights and interference lights have mutually perpendicular polarization states. Consequently, by scrambling the polarization states of the signal lights into every possible polarization states at nearly equal probabilities, at high speed by the high speed polarization scrambler 5, it is possible to reduce the probability for having the worst polarization states of the signal lights and the interference lights and lower the penalty in a case of having the worst value for the transmission characteristic. As a result, it becomes possible to reduce the required value for the rejection of the fiber grating 73 used in the optical ADM element 11, so that it becomes possible to realize the optical ADM device that can be manufactured by the currently available manufacturing technology at a practically reasonable cheap manufacturing cost.

Figure 6:
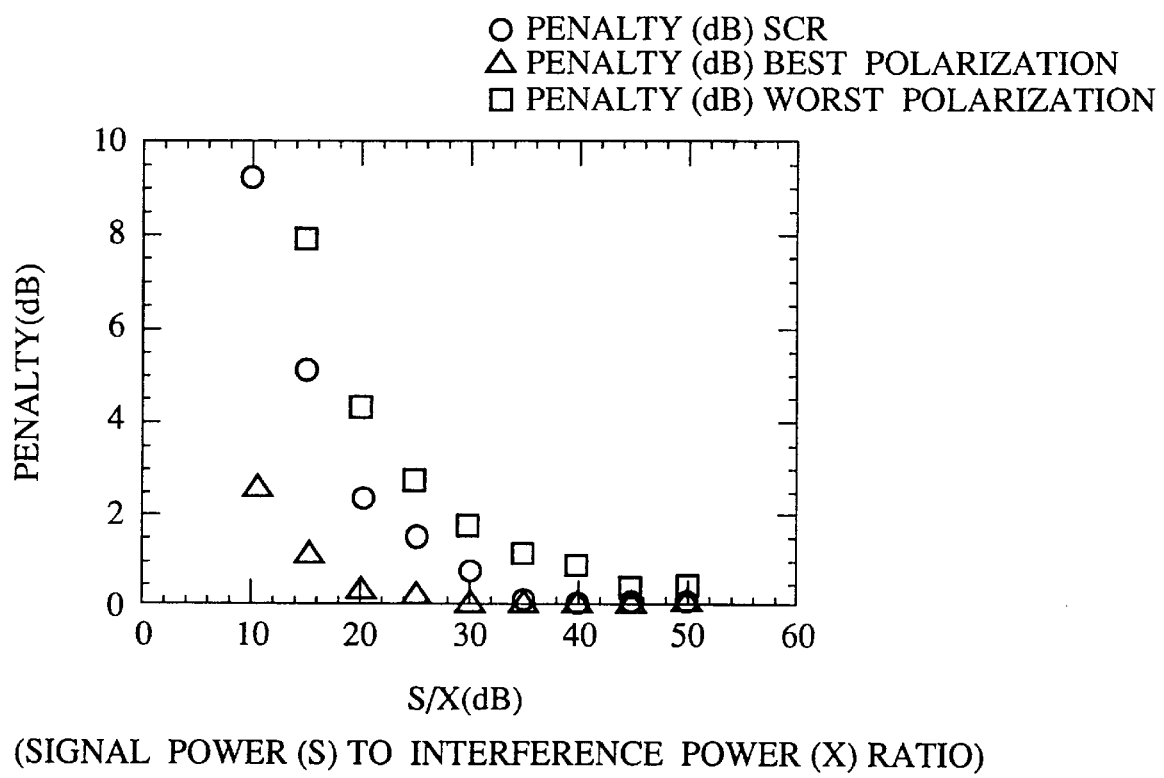
FIG. 6 is a graph of penalty versus signal power to interference power ratio for three cases including a case of using a high speed polarization scrambler according to the present invention.

FIG. 6 shows a relationship between the penalty and an S/X ratio (dB) (signal power (S) to interference power (X) ratio) for three cases: a case of the worst polarization (plotted by triangle marks); a case of the best polarization (plotted by square marks); and a case of using the high speed polarization scrambler (SCR) of the present invention (plotted by circle marks).

Figure 7:
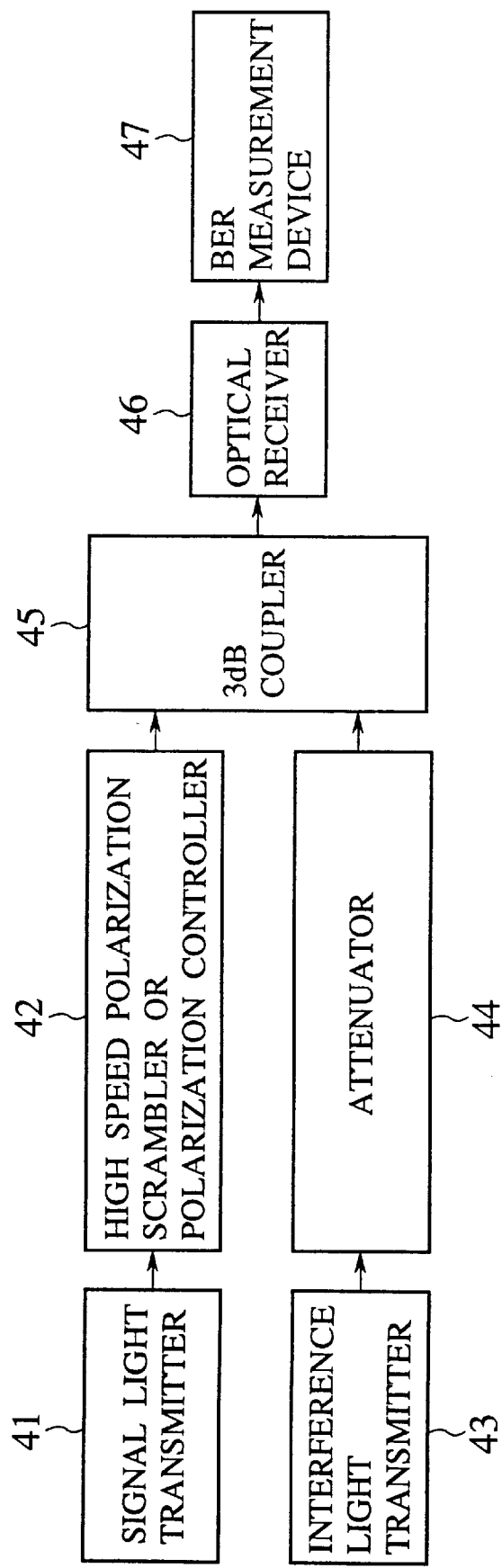
FIG. 7 is a block diagram of a testing device used for obtaining measurement results plotted in the graph of FIG. 6.

These characteristics shown in FIG. 6 were obtained by a testing device shown in FIG. 7. In the testing device of FIG. 7, the signal lights outputted by a signal light transmitter 41 are subjected to either a high speed scrambling or a polarization control to an arbitrary polarization by a high speed scrambler or polarization controller 42, while the interference lights outputted by an interference light transmitter 43 are subjected to a level adjustment by an attenuator 44. Then, the high speed scrambled or polarization controlled signal lights and the level adjusted interference lights are coupled by a 3 dB coupler 45. The coupled output of the 3 dB coupler 45 is then received by an optical receiver 46, and a BER (Bit Error Rate) of the received output of the optical receiver 46 is measured by a BER measurement device 47.

Note that the polarization controller here has a configuration capable of obtaining an arbitrary polarization by rotating a ½λ plate and a ¼λ plate. Then, in obtaining the measurement results plotted in FIG. 6, the polarization controller was used for the measurement in a case of the best polarization and in a case of the worst polarization, while the high speed polarization scrambler was used for the measurement in a case of using the high speed scrambler (SCR) instead of the polarization controller.

As already mentioned above, in constructing an optical submarine cable system, it is necessary to account for the penalty in a case of the worst polarization. In this regard, as shown in FIG. 6, in a case of using the high speed polarization scrambler of the present invention, the penalty becomes roughly a middle of a case of the best polarization and a case of the worst polarization for the S/X ratio below of 30 dB which corresponds to the rejection value of below 30 dB in the fiber grating, but the penalty becomes almost the same as a case of the best polarization for the S/X ratio of over 35 dB which corresponds to the rejection value of 35 dB in the fiber grating, so that it was experimentally confirmed that the optical ADM device according to the present invention is almost penalty-free for the S/X ratio of over 35 dB.

As described, by using the transmission signal lights with their polarization states scrambled at high speed by the high speed polarization scrambler 5 as an input to the optical ADM element 11 for carrying out the add/drop multiplexing operation, the required value for the rejection of the fiber grating can be relaxed from 50 dB to about 35 dB, so that it is possible to realize the optical ADM device that can be manufactured by the currently available manufacturing technology at a practically reasonable cheap manufacturing cost.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An optical add/drop multiplexing device, comprising:
   a high speed polarization scrambler for entering signal lights with a data modulation at a high speed bit rate applied thereto, and scrambling polarization states of entered signal lights at high speed; and
   an optical add/drop element using a fiber grating, for receiving the signal lights with the polarization states scrambled by the high speed polarization scrambler, and carrying out an add/drop multiplexing operation for signal lights in a specific wavelength among received signal lights, so as to reduce degradation of a transmission characteristic of the optical add/drop multiplexing device due to beat noises caused by an interference of fiber grating leakage components occurring in the optical add/drop element.

2. The optical add/drop multiplexing device of claim 1, wherein the high speed polarization scrambler scrambles the polarization states of the entered signal lights so as to lower a probability for having worst polarization states of signal lights and interference lights.

3. The optical add/drop multiplexing device of claim 1, wherein the high speed polarization scrambler scrambles the polarization states of the entered signal lights into every possible polarization states at nearly equal probabilities.

4. The optical add/drop multiplexing device of claim 1, wherein the high speed polarization scrambler scrambles the polarization states of the entered signal lights by varying a refractive index of a member through which the entered signal lights in a specific polarization state pass.

5. The optical add/drop multiplexing device of claim 1, wherein the high speed polarization scrambler includes:
   a substrate member through which the entered signal lights pass, the substrate member having an electrode formed thereon; and
   a sinusoidal wave generator for applying a sinusoidal wave voltage of a constant amplitude to the electrode so as to vary a refractive index of the substrate member with respect to the entered signal lights in a specific polarization state.

6. The optical add/drop multiplexing device of claim 1, wherein the high speed bit rate of the data modulation applied to the signal lights entered at the high speed polarization scrambler is in an order of GHz, and a frequency of a high speed scrambling by which the high speed polarization scrambler scrambles the polarization states of the entered signal lights is over one tenth of the high speed bit rate.

7. The optical add/drop multiplexing device of claim 1, further comprising:
   a modulator for applying the data modulation at the high speed bit rate to the signal lights in a specific polarization state, and supplying the signal lights with the data modulation applied thereto to the high speed polarization scrambler.

8. The optical add/drop multiplexing device of claim 1, wherein the optical add/drop element includes:
   a first optical circulator having a drop port, for entering the signal lights with the polarization states scrambled by the high speed polarization scrambler;
   a fiber grating for reflecting to the first optical circular those signal lights in the specific wavelength among the signal lights entered at the first optical circulator, so as to drop those signal lights in the specific wavelength as drop signal lights from the drop port, and transmitting other signal lights in wavelengths other than the specific wavelength; and
   a second optical circulator having an add port, for receiving the signal lights transmitted through the fiber grating while circulating add signal lights in the specific wavelength entered from the add port to the fiber grating so as to have the add signal lights reflected to the second optical circulator by the fiber grating, and outputting the signal lights transmitted through the fiber grating along with the add signal lights reflected from the fiber grating.

9. The optical add/drop multiplexing device of claim 8, wherein the fiber grating is required to have a rejection value of 35 dB at most.

10. A method of optical add/drop multiplexing by an optical add/drop multiplexing device, comprising the steps of:
    scrambling polarization states of input signal lights at high speed, the input signal lights being applied with a data modulation at a high speed bit rate; and
    carrying out an add/drop multiplexing operation by an optical add/drop element using a fiber grating, for the signal lights in a specific wavelength among the signal lights with the polarization states scrambled by the scrambling step, so as to reduce degradation of a transmission characteristic of the optical add/drop multiplexing device due to beat noises caused by an interference of fiber grating leakage components occurring in the optical add/drop element.

11. The method of claim 10, wherein the scrambling step scrambles the polarization states of the input signal lights so as to lower a probability for having worst polarization states of signal lights and interference lights.

12. The method of claim 10, wherein the scrambling step scrambles the polarization states of the input signal lights into every possible polarization states at nearly equal probabilities.

13. The method of claim 10, wherein the scrambling step scrambles the polarization states of the input signal lights by varying a refractive index of a member through which the input signal lights in a specific polarization state pass.

14. The method of claim 10, wherein the scrambling step further includes the steps of:
    passing the input signal lights through a substrate member having an electrode formed thereon; and
    applying a sinusoidal wave voltage of a constant amplitude to the electrode so as to vary a refractive index of the substrate member with respect to the input signal lights in a specific polarization state.

15. The method of claim 10, wherein the high speed bit rate of the data modulation applied to the input signal lights is in an order of GHz, and a frequency of a high speed scrambling by which the polarization states of the input signal lights are scrambled at the scrambling step is over one tenth of the high speed bit rate.

16. The method of claim 10, further comprising the step of:

applying the data modulation at the high speed bit rate to the input signal lights in a specific polarization state, and supplying the input signal lights with the data modulation applied thereto to the scrambling step.

17. The method of claim 10, wherein the carrying out step includes the steps of:

entering the signal lights with the polarization states scrambled by the scrambling step into a first optical circulator having a drop port;

reflecting to the first optical circulator those signal lights in the specific wavelength among the signal lights entered at the first optical circulator by a fiber grating, so as to drop those signal lights in the specific wavelength as drop lights from the drop port, and transmitting other signal lights in wavelengths other than the specific wavelength through the fiber grating; and receiving the signal lights transmitted through the fiber grating at a second optical circulator having an add port, while circulating add signal lights in the specific wavelength entered from the add port to the fiber grating so as to have the add signal lights reflected to the second optical circulator by the fiber grating, and outputting the signal lights transmitted through the fiber grating along with the add signal lights reflected from the fiber grating.

18. The method of claim 17, wherein the fiber grating is required to have a rejection value of 35 dB at most.

* * * * *